Figure 2:
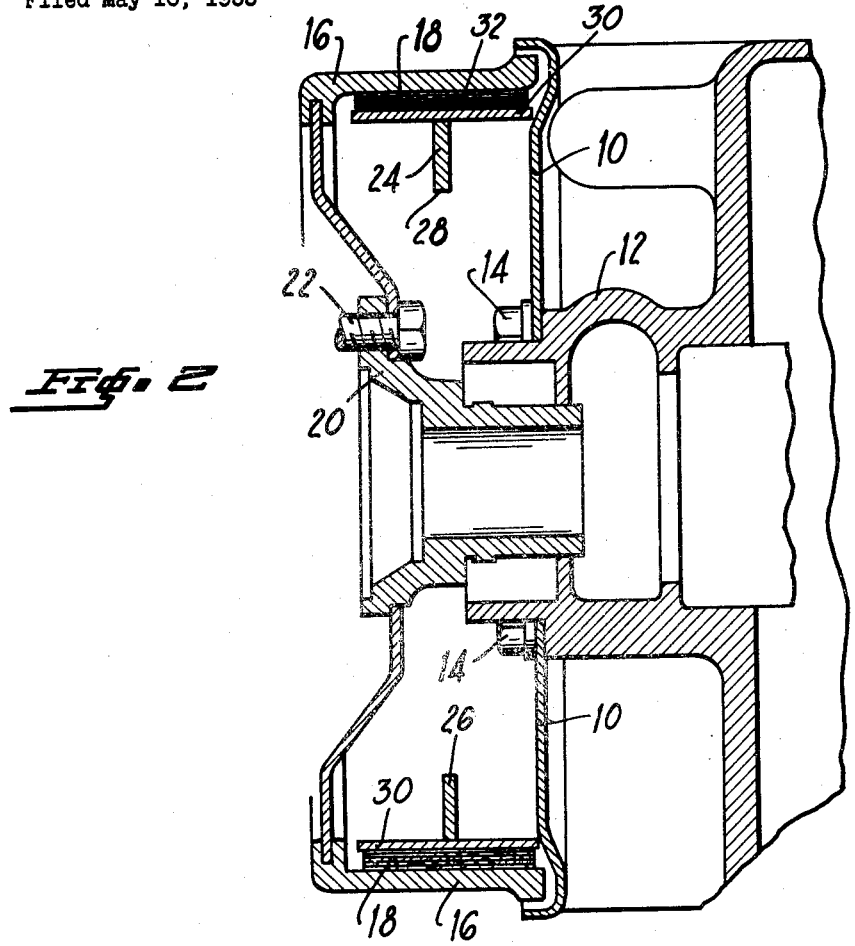

March 3, 1959     R. A. GOEPFRICH     2,875,862
WHEEL BRAKE
Filed May 16, 1955     2 Sheets-Sheet 1
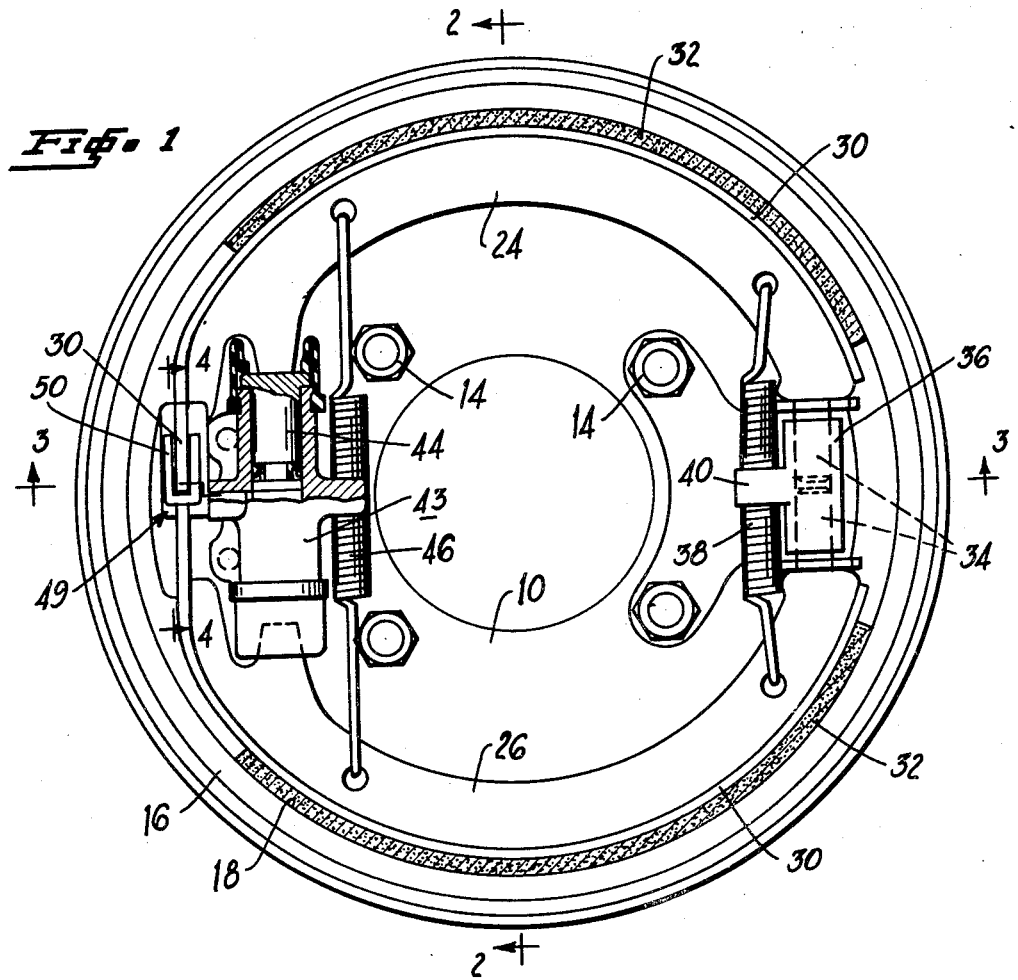
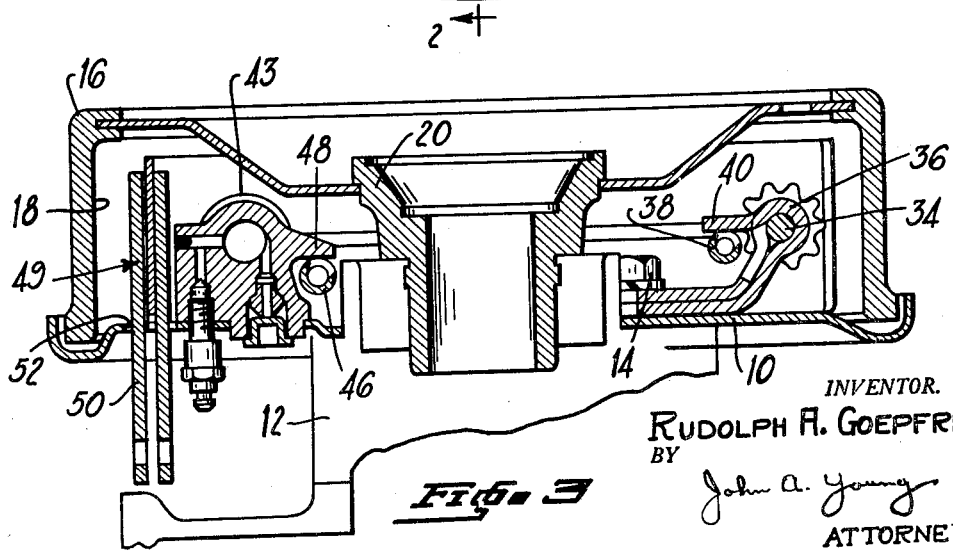
INVENTOR.
RUDOLPH A. GOEPFRICH
BY John A. Young
ATTORNEY March 3, 1959 R. A. GOEPFRICH 2,875,862
WHEEL BRAKE
Filed May 16, 1955 2 Sheets-Sheet 2

INVENTOR.
RUDOLPH A. GOEPFRICH
BY
John A. Young
ATTORNEY

United States Patent Office 2,875,862
Patented Mar. 3, 1959

2,875,862

WHEEL BRAKE

Rudolph A. Goepfrich, South Bend, Ind., assignor to Bendix Aviation Corporation, South Bend, Ind., a corporation of Delaware Application May 16, 1955, Serial No. 508,606

4 Claims. (Cl. 188—106)

This invention relates to brakes and more specifically to an internally expanding "shoe" type brake which is mounted on the vehicle at the prop shaft or drive axle. Although the brake is particularly adaptable for military vehicles, it is not limited to any specific usage.

Among the general requirements of a military vehicle is that the components thereof weigh as little as possible. The reason for this is that the vehicle can be more easily transported by air, and also it is generally less cumbersome to handle.

In reducing the weight of the vehicle, one approach is to construct the vehicle components of lighter material and also, whenever possible, to reduce the physical size of the components. The present invention proceeds along an entirely different principle in that some of the wheel brakes are completely eliminated. The function of a plurality of brakes is consolidated so that a single brake takes the place of several distinct wheel brakes, thus reducing the number of brakes required.

One of the problems of vehicle braking involves the difference in distribution of weight between the front and rear wheel axles of the vehicle. The retarding effort on a vehicle which results from application of the wheel brakes is related to the axle load. That is, the brakes associated with the wheels having a higher axle load are required to exert greater effort in stopping the vehicle than the brakes associated with the wheels having a lower axle load.

It is an object of the present invention to impart retarding effort on all four wheels of the vehicle by means of a braking system utilizing but a single brake. A related feature of the invention is to exert adequate retarding effort on the vehicle irrespective of axle load distribution.

A further object of the invention is to combine both hydraulic and mechanical actuation in a single brake which is capable of being both mechanically and hydraulically applied to impart retarding effort to all four wheels of a vehicle.

From a performance standpoint, it is my object to obtain an effective parking brake which can exert a high order of torque load.

From a structure standpoint, it is my object to obtain the ultimate in simplicity of construction of the brake, reducing to a minimum the number of brake components.

Figure 4:
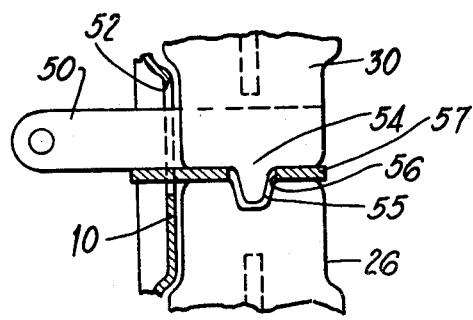

Additional objects and features of the invention will become apparent from a consideration of the following description which refers to the accompanying drawings wherein:

Figure 1 is a side elevation of the brake with a portion of the fluid motor broken away to show the pistons therein;

Figures 2 and 3 are section views, taken respectively on the lines 2—2 and 3—3 of Figure 1; and Figure 4 is a fragmentary section view taken on line 4—4 of Figure 1.

The brake is located in the vehicle drive system. A brake of this type is sometimes referred to as a propeller shaft brake. The fixed part of the brake, including support member 10, is secured by a plurality of fastening devices 14 to a stationary part of the vehicle, as for example a transfer case bearing cap 12.

A rotatable drum 16 having cylindrical surface 18, is fastened to a propeller shaft companion flange 20 which turns with the propeller shaft driving the wheels. Fastening members 22 (Figure 2) are used to connect the drum to the companion flange 20 of the propeller shaft.

Mounted within the drum, and engageable therewith, I provide a pair of brake shoes 24 and 26, each inclusive of a web 28 and a rim 30 having friction material lining 32.

Adjacent anchorage ends of the shoes bear against adjusting screws 34 which are threadedly received in an anchoring bracket 36. It will be noted that brake torque from the brake shoes is transmitted to the bracket 36, which in turn, transfers the load to a fixed part of the vehicle independently of the support member 10.

Even though the bracket 36 is held against the support member 10, anchoring load transmitted to bracket 36 is not taken by the support 10, but is transmitted directly to the transfer case bearing cap 12. The fact that these two parts 36 and 10 are held side by side and are fastened to the bearing case by the same bolts does not require that the braking torque which is taken by part 36 be also transmitted through part 10. For this reason, the part 10 may be made of lighter construction since it is not required that the member 10 be capable of transmitting torque.

A spring 38 is fastened between the anchorage ends of the shoes keeping them in abutment with the adjusting screws 34. The anchoring bracket 36 is provided with a struck portion 40 (refer to Figure 3) which depresses the midportion of spring 38, thus imposing lateral loading of the brake shoes, holding them in engagement with spaced ledges on the support member.

Operatively connected to the adjacent expansible ends of the shoes is a fluid motor or wheel cylinder 43. A pair of oppositely acting pistons 44 bear against the expansible ends of the shoes causing them to be spread apart. A return spring 46 holds the brake in a normally released position. A portion 48 of the fluid motor extends therefrom, and the return spring 46 is lodged beneath the portion 48, thus depressing the middle of the spring and causing lateral loading of the brake shoes to hold them against positioning ledges.

In addition to the hydraulic actuating means, there is provided mechanically operable means 49 for applying the brake shoes. This mechanically operable means consists of a U-shaped cross section lever 50 which is received through a slot 52 in support member 10 (Figures 3 and 4). The sides of the lever embrace an extended portion of the rim 30 of brake shoe 24 (Figures 1 and 3). A tongue-in-groove connection 54 is formed between the ends of the rims of the brake shoes. The tongue 55 of the tongue-in-groove connection 54 passes through an opening 56 in the applying lever thus fixing the lever laterally. These features are best seen in Figure 4. The base or connecting leg 57 of the lever 50 abuts at opposite sides thereof with the ends of the rims 30. The opening 52 allows the linkage 49 to move radially so that the shoes may be self-centering. The linkage is also free to move tangentially so that each of the brake shoes may be fully applied against the surface 18 of the drum.

When the brake is applied, pressure from a master cylinder source (not shown) is transmitted to the fluid motor 43 spreading the pistons 44 apart and bringing lining 32 on each of the brake shoes into forcible engagement with surface 18 of the drum. Engagement of the shoes with the drum imparts retarding effort on the propeller shaft which is drivably connected to the rear wheels. Since turning of the propeller shaft is impeded by brake operation, this imparts retarding effort to the rear wheels to stop the vehicle. When the vehicle is in four wheel drive (all of the wheels are drivably connected to the propeller shaft), then retarding effort will be communicated to the front and rear wheels.

When the brake is mechanically applied, lever 50 is rotated causing opposite sides of the base 57 of the lever to bear against rims 30 of the brake shoes. Assuming counterclockwise drum rotation indicated in Figure 1, brake shoe 26 acts as a leading shoe anchoring on bracket 36; brake shoe 24 operates as a trailing shoe, anchoring against lever 50. The parking brake is arranged so that it can be "set" in an applied position to maintain the vehicle in a stationary position. If the vehicle is in four wheel drive, then parking brake action prevents rotation of the drive shaft which is operatively connected to each of the four wheels of the vehicle. Thus, parking brake operation exerts impeding effort on all four wheels of the vehicle.

Although this invention has been described in connection with but a single embodiment as an example, it will be apparent to those skilled in the art that various changes in design and location of components can be made without departing from the underlying principles of the invention. I intend, therefore, to include within the scope of the following claims all equivalent structure and arrangement of parts by which the same, or substantially the same, results can be accomplished.

I claim:

1. A propeller shaft brake arranged to impede both front and rear vehicle wheels, said brake comprising a support member, an anchor bracket fixed to a stationary part of the vehicle independently of said support member, a pair of free-floating shoes having adjacent anchorage ends engageable with said anchor bracket, a wheel cylinder secured to said support member and operatively connected to adjacent expansible ends of said shoes, resilient means fastened between the adjacent expansible ends of said shoes to hold them in a normally released position, said resilient means being deflected at the midportion thereof to exert a lateral load on said shoes tending to hold them aaginst said support member, and means for mechanically applying said shoes and located radially outward from said wheel cylinder, said mechanically-applying means being inclusive of a U-shaped cross section lever which turns in a plane perpendicular to the plane of movement of said shoes, extending rim portions of said shoes against which the lever abuts to apply said shoes, a tongue formed in the extending rim portion of one of said shoes which is received through an opening in said lever and projects into a slot in the extending rim portion of the other shoe, the sides of said lever being formed to embrace the extending rim on one of said shoes to guide the lever when it turns responsively to applying effort.

2. A propeller shaft brake arranged to impart impeding effort to both front and rear vehicle wheels, said brake comprising adjacent anchorage ends, and adjacent expansible ends, a fluid motor operatively connected to the adjacent expansible ends of said shoes, resilient means fastened between the expansible ends of said shoes to hold them in a normally released position and means for mechanically applying said shoes, said means being inclusive of extending rims of said shoes having interfitting portions thereof, and a U-shaped cross section lever embracing the extending rim of one of said shoes, said lever being arranged to exert applying effort on said shoes when said lever is turned.

3. A propeller shaft brake arranged to impede both front and rear vehicle wheels, said brake comprising a support member, a pair of free-floating shoes having adjacent anchorage ends engageable with a fixed anchor, a wheel cylinder secured to said support member and operatively connected to adjacent expansible ends of said shoes, resilient means fastened between the adjacent expansible ends of said shoes to hold them in a normally released position, said resilient means being deflected at the midportion thereof to exert a lateral load on said shoes tending to hold them against said support member, and means for mechanically applying said shoes and located radially outward from said fluid motor, said mechanically-applying means being inclusive of a U-shaped cross section lever which turns in a plane perpendicular to the plane of movement of said shoes, extending rim portions of said shoes against which the lever abuts to apply said shoes, a tongue formed in the extending rim portion of one of said shoes which is received through an opening in said lever and projects into a slot in the extending rim portion of the other shoe, the sides of said lever being formed to embrace the extending rim on one of said shoes to guide the lever when it turns responsively to applying effort.

4. A propeller shaft brake arranged to impart impeding effort to both front and rear vehicle wheels, said brake comprising a pair of brake shoes having adjacent expansible ends and adjacent anchorage ends, an extending rim portion constructed on each of the adjacent expansible ends of said brake shoes, said rim portions having mutually interfitting ends, a fluid motor operatively connected to the adjacent expansible ends of said shoes, anchorage means comprising a folded sheet metal stamping arranged to lie flatly at the radially inner portion and having a hollowed turned-up radially outer portion which lies in the plane of the webs of said shoes, adjusting means received in said hollowed portion and adapted to engage the anchorage ends of said shoes, and means for mechanically applying said shoes combined with the extending rim portions of said shoes, said means being inclusive of a U-shaped cross-section lever embracing the extending rim of one of said shoes, said lever being arranged by rotation transversely to said shoes to exert applying effort on said shoes when said lever is turned.

References Cited in the file of this patent
UNITED STATES PATENTS

| 2,345,107 | Goepfrich | Mar. 28, 1944 |

FOREIGN PATENTS

| 1,035,804 | France | Apr. 22, 1953 |
| 565,280 | Great Britain | Nov. 3, 1944 |